(12) United States Patent
Edlinger

(10) Patent No.: US 6,395,054 B1
(45) Date of Patent: *May 28, 2002

(54) PROCESS FOR PRODUCING POZZOLANES, SYNTHETIC BLAST FURNACE SLAGS, BELITE OR ALITE CLINKERS, OR PIG IRON ALLOYS FROM OXIDIC SLAGS

(75) Inventor: Alfred Edlinger, Baden (CH)

(73) Assignee: "Holderbank" Financiere Glarus AG, Glarus (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/011,147

(22) PCT Filed: Jun. 3, 1997

(86) PCT No.: PCT/AT97/00113

§ 371 (c)(1),
(2), (4) Date: Feb. 4, 1998

(87) PCT Pub. No.: WO97/46717

PCT Pub. Date: Dec. 11, 1997

(30) Foreign Application Priority Data

Jun. 5, 1996 (AU) .................................................. 979/96
Jun. 19, 1996 (DE) ......................................... 196 24 428

(51) Int. Cl.⁷ ................................................. C21B 3/04
(52) U.S. Cl. .............................. 75/434; 75/384; 75/561; 75/540; 65/20
(58) Field of Search .......................... 75/434, 561, 540, 75/386, 384; 65/20

(56) References Cited

U.S. PATENT DOCUMENTS

| 4,198,228 A | * | 4/1980 | Jordan | 75/464 |
| 4,394,165 A | * | 7/1983 | Satoh et al. | 75/556 |
| 4,529,442 A | * | 7/1985 | Tommaney et al. | 75/555 |
| 4,568,386 A | * | 2/1986 | Heller et al. | 75/384 |
| 5,078,785 A | * | 1/1992 | Ibaraki et al. | 75/386 |
| 5,082,044 A | * | 1/1992 | Christensen | 75/384 |
| 5,518,523 A | * | 5/1996 | Brotzmann | 75/501 |
| 5,588,982 A | * | 12/1996 | Hendrix | 75/10.5 |
| 5,776,226 A | * | 7/1998 | Edlinger | 75/500 |

FOREIGN PATENT DOCUMENTS

| DE | 38 22 705 | | 1/1990 | | |
| EP | 364 825 | | 4/1990 | | |
| EP | 707 083 | | 4/1996 | | |
| WO | 81 02584 | * | 9/1981 | .................. | 75/434 |
| WO | 94 17214 | | 8/1994 | | |
| WO | 95 07365 | | 3/1995 | | |
| WO | 96 24696 | | 8/1996 | | |

OTHER PUBLICATIONS

Osborne, A.K. An Encyclopaedia of the Iron and Steel Industry, 1956, pp. 240, 318, and 442.*
Derwent publication 1986–311096 "Pig iron production computerised control—by monitoring oxygen trnasfer from slag and pig iron and exhaust fumes composition". SU 1225859 Apr. 23, 1986.*
Edlinger, A. Derwent Publication No. 95–082498, "Manufacture of Steel and Hydraulic Cementaceous Material", Nov. 1998.*
Edlinger, A. Derwent Publication No. 95–123437, "Method of Treating Pig Iron to Produce Steel Using Specified Slag.", May 1999.*
Edlinger, A. Derwent Publication No. 96–384464, "Pig Iron or Steel and Cement Clinker Production from Slag.", Apr. 1998.*

* cited by examiner

Primary Examiner—Roy King
Assistant Examiner—Tima McGuthy-Banks
(74) Attorney, Agent, or Firm—Pillsbury Winthrop LLP

(57) ABSTRACT

A process that produces pozzolanes, synthetic blast furnace slags, belite, or alite clinkers, as well as pig iron alloys, from oxidic liquid slag. The oxidic liquid slag is reduced above an iron bath in a reactor containing submerged tuyeres. Carbon is blown through the submerged tuyeres and into the iron bath to maintain the iron bath at a carbon content of between 2.5 wt % and 4.6 wt %.

38 Claims, 3 Drawing Sheets

PROCESS FOR PRODUCING POZZOLANES, SYNTHETIC BLAST FURNACE SLAGS, BELITE OR ALITE CLINKERS, OR PIG IRON ALLOYS FROM OXIDIC SLAGS

This application is the national phase of international application PCT/AT97/00113 filed Jun. 3, 1997 which designated the U.S.

BACKGROUND OF THE INVENTION

1. Field of the Invention

The invention relates to a process for producing pozzolanes, synthetic blast furnace slags, belite or alite clinkers as well as pig iron alloys from oxidic slags by reducing the oxidized liquid slags above an iron bath. The invention also relates to an arrangement for carrying out said process.

2. Related Art

German Auslegeschrift No. 26 48 290 describes a process for treating iron-containing metallurgical slags, which essentially resides in mixing blast furnace slag with steel works slag in order to obtain an end product having a suitable composition. In doing so, it is particularly advantageous to carry out the mixing process through an oxygen feed lance designed as an agitator for oxidizing the iron granules and producing a homogenous mixture. The synthetic slag produced exhibits physical properties superior to those of the blast furnace slag, thus being excellently apt for granulation. The free lime residues approximately correspond to those of the blast furnace slag.

German Patent No. 26 11 889 mentions a process for producing hydraulic binders from metallurgical wastes and lime. In an integrated steel making plant about 400 kg of metallurgical wastes are formed per ton of pig iron on the production route from ore to steel, 48% being blast furnace slag and 35% being steel works slag. The balance is comprised of metallurgical debris, sludges and dusts. The idea underlying that invention resides in mixing such metallurgical wastes with lime at appropriate weight ratios in the liquid state and quenching the ready melt to form granulates in order to produce a cement clinker. Basically, all of the converters known in a steel making plant are suitable for mixing and melting while supplying fuel and oxygen. The bottom-blowing OBM converter is, however, particularly advantageous, its bottom tuyeres being suitable for introducing fuel and fine lime. The melting procedure is effected in an oxidizing manner, the oxides being present in the finished melt in the dissolved state.

A process for producing cement from metallurgical slags is known from South-African Patent Specification 94/0521. According to that process, the acidic blast furnace slags are mixed with the basic steel works slags in the liquid state at high temperatures exceeding 1700° C. In order to produce an advantageous cement clinker, the mixing ratio may range between 30% and 80% blast furnace slag and between 20% and 70% converter slag. According to that invention, the mixed slag melt is slowly cooled down to a temperature of 1000° C. in a first step and, after this, more rapidly in a second step, the solidified end product being ground afterwards.

South-African Patent Specification 94/05222 shows and describes a process for producing pig iron and cement clinker. There is provided a melter gasifier comprising a fluidized bed of coal, in which the necessary energy is generated by supplying oxygen, an iron bath comprising a slag layer being present therebelow. At first, limestone and iron ore are charged into a preheating shaft. There, they are dried and calcined and finally sintered together to calcium ferrite to the major extent before getting into the melter gasifier. The heat for that preheating shaft is generated by burning the offgas from the melter gasifier by means of preheated air. The iron melt from the reduced iron ore collecting within the melter gasifier and the liquid slag in cement clinker composition are removed from the melter gasifier in the liquid state. It is in the sense of that invention to introduce into the melter gasifier toxic waste substances containing, for instance, dioxin, furan, PCB and chlorides. Liquid steel works converter slag may likewise be added in an amount acceptable for the production of cement clinker.

Another process for producing steel and hydraulically active binders, i.e., cement is described in Austrian Patent No. 400 037. The idea of that invention resides in refining pig iron by adding steel slag and utilizing the high content of iron oxide of the steel slag in order to thereby eliminate carbon and silicon from the pig iron. The steel slag was, for instance, united with 0.5 weight portions of liquid pig iron and that mixture was maintained at 1660° C. for six hours, thereby having been able to reduce the FeO and MnO contents of the steel slag from 30.5% to 10.5%. The final slag obtained may be used as a cement clinker.

When processing oxidic slags, chromium-oxide-containing slags, in particular, constitute problems in the production of cement grinding admixtures since the chromium content of such slags would have to lie substantially below 500 ppm. In connection with the parameters required from a slag-metallurgical point of view for working up oxidic slags, it has been recognized that the iron oxide content of an iron bath used for reduction may be of importance. With different charging materials, reduction above an iron bath results in end products incapable of being precisely controlled and, in particular, when using chromium-oxide-containing slags the necessary dechroming cannot be readily ensured with an iron bath. It is known to blow carbon into the iron bath, wherein it has, however, been proved that too high a carbon content will result in local overheatings and negative reactions in the course of reduction. Precise process control has not yet been readily feasible because of the parameters hitherto observed in the reduction of oxidic slags.

SUMMARY OF THE INVENTION

The invention aims at providing a simple and economical procedure using conventional reactors, such as, for instance, bottom-blowing converters without applying non-proven blowing technologies and nozzling technologies, which enables the values required for effective dechroming to be precisely observed, it being primarily aimed at carrying out the process rapidly and in a simple manner. The economy is to be enhanced, in particular, by avoiding regional overheatings as well as excessive foaming. Furthermore, the blowing in of carbon and oxygen is to be ensured in a manner that refining of the pig iron during coal blowing is avoided with conventional nozzling and blowing technologies while simultaneously reducing the respective quantities, thereby preventing coal from being blown through and iron from being discharged as well as overfoaming during the running process.

To accomplish this object, the process according to the invention essentially resides in the blowing of carbon into the iron bath through submerged tuyeres in order to maintain a carbon content of between 2.5 and 4.6% by weight. By the fact that the carbon content is kept within narrow limits ranging between 2.5 and 4.6% by weight, oversaturation and hence floating of carbon involving the risk of subsequent burning are avoided on the boundary layer, on the one hand. In addition, dechroming is observed to proceed in a surprisingly rapid manner by keeping the carbon content within the indicated limits. While dechroming reactions so far have taken 15 to 30 minutes, it has surprisingly been shown that dechroming can be completed within few minutes when observing the concrete limit values indicated for the carbon content. In an advantageous manner, the process is carried out by adjusting the carbon content to between 2.5 and 3.5% by weight.

In a particularly advantageous manner, the height of the iron bath is adjusted to between 300 and 1200 mm, wherein, upon exceeding of an iron bath height of 1200 mm, pig iron is tapped and the amount of carbon blown in is controlled as a function of a measuring probe. By adjusting the height of the iron bath to between 300 and 1200 mm, operation may be effected at normal pressure by means of conventional tuyeres without involving the risk of blowing through. By using conventional tuyere technologies, well-tested pressure controls may be applied to ensure that the amounts of oxygen and carbon can actually be controlled with a view to safely maintaining the desired carbon values within the iron bath.

The process of the invention a allows for the simple control and hence better consistencies of the respectively sought end products. The coercive measures provided, in particular, for as rapid and complete a dechroming operation as possible in a simple manner may be observed in that an echo-sounding device or a sound level monitor is used as the measuring probe and that additional carbon and/or CaO is blown into the iron bath at the occurrence of foam. It has been surprisingly found that simple probes, such as, for instance, an echo-sounding device or a sound level monitor suffice to ensure the desired control and hence the obtainment of reproducible results.

In order to avoid the risk of local overheating and to safeguard the respectively sought reduction potential even in the immediate contact with the molten slag, it is advantageously proceeded in a manner that air or oxygen is blown into the iron bath and heated air (700 to 1200° C.) is blown onto the floating liquid slag in an amount exceeding the amount blown into the bath by a factor 2 to 3. In this manner, melting of partially already solidified slags as well as overheating of the slags substantially enhancing the reduction of the chromium oxide content of slags are ensured in the course of a 60 to 80% afterburning at a heat transfer efficiency of 75 to 95%. Accordingly highly liquid slags can be rapidly reacted with the carbon content of the iron bath, thereby causing the chromium oxide content of the slag to drop to values of far below 300 ppm or even below 100 ppm within a few minutes.

By maintaining the above conditions and, in particular, the height of the iron bath, it is feasible to minimize the quantitative control of the oxygen feed rate and the carbon blow-in rate to such an extent that negative marginal effects are completely eliminated. At carbon contents that are too high, the carbon will not dissolve into the iron bath. Carbon will then float on the bath, being burnt largely without any effect (this being called "blow-through"). At a carbon content that is too low, the iron bath will become relatively viscous at operating temperatures of 1500° to 1550° C. such that only little carbon will be taken up by the bath for kinetic reasons. Carburization with slight blow-through losses will be feasible only upon short-term temperature rises to approximately 1600° to 1650° C. By the process control according to the invention, operation may be effected at an oxygen feed rate of below 150 m$^3$/min and a carbon blow-in rate of below 200 kg/min, thereby consuming substantially lower amounts of carbon even at extended reaction times within the converter. In tests it was, furthermore, demonstrated that, at a carbon content in the iron of below 2.5% by weight, the chromium oxide content of the slag remains substantially higher and cannot be lowered any longer to the desired low values in a reproducible manner.

In a particularly advantageous manner, the control of the process may be effected such that the pressure within the blowing ducts to the tuyeres opening into the iron bath is controlled as a function of the height of the bath, being raised with the height of the bath increasing. In this manner thorough mixing of the carbon in the bath is, at the same time, ensured without local excess refining or local overheating occurring. This is important also for afterburning (enlargement of the bath surface by approximately 20 times in relation to the "quiet" melt surface as opposed to the converter gas space).

In a particularly advantageous manner, the process is carried out in that inert or oxidizing gases optionally loaded with solids are blown in below the surface of the iron bath at an overall blowing rate of from 2.5 Nm$^3$/min·ton iron melt to 25 Nm$^3$/min·ton iron melt, preferably 5 Nm$^3$/min·ton iron melt to 15 Nm$^3$/min·ton iron melt. By such blowing rates it is feasible to ensure sufficient agitation of the bath within the iron bath reactor, thereby safeguarding the equalization of the concentration and the homogenization of the iron melt and slag layer.

Based on the control according to the invention, it has become feasible to supply and draw off the liquid slag continuously as opposed to the hitherto applied mode of procedure. This is due, in particular, to the reaction times being substantially reduced and the process parameters being more precisely followed, thereby allowing for complete reaction and, in particular, complete dechroming within extremely short times of but few minutes.

In order to safely avoid undesired local overheating, it may advantageously be proceeded in a manner that the amount of carbon blown in per unit time is reduced and/or at least partially substituted by CaO upon exceeding of a limit temperature within the slag or gas space.

Lime, dolomite, bauxite, chamotte, fluor spar, calcium carbide and/or other slag fluxes are particularly advantageously blown into the melt, preferably below and/or above the iron bath surface. In order to adjust the carbon content within the iron bath and to equalize the temperature prevailing within the iron bath reactor, coal, coke, slack coal, brown coal coke, petroleum coke, graphite and/or other carbon carriers are preferably blown into the iron melt below the bath surface along with a conveying gas and, at the same time, oxygen and/or oxygen-containing gases are fed to the iron melt for the at least partial combustion of the carbon.

In a particularly economic manner, the process is carried out such that the reaction gases CO and $H_2$ emerging from the iron melt are afterburnt at least partially in the gas space of the iron bath reactor by top-blowing oxygen, air, hot wind, optionally enriched with oxygen, and the thus generated heat is transferred to the melt. Thereby, it is feasible to improve the thermal efficiency of the process. In doing so, tuyeres stationarily installed in the upper, conical portion of the converter may be employed in the iron bath reactor for carrying out the process according to the invention, or lances for afterburning either may be introduced into the converter through the converter mouth or may blow into the converter from a position above the converter mouth. A combination of lances and tuyeres may also be envisaged.

By applying such an afterburning technique, also liquid and gaseous fuels may be used for supplying energy during process control and for adjusting the carbon content within the iron melt. The energy to be afforded for cracking the liquid and gaseous hydrocarbons present in the iron melt normally exceeds the energy recovered by burning the carbon portion to CO, and hence those fuels would cause the melt to cool down unless afterburning of the reaction gases under simultaneous heat retransfer to the melt took place.

In order to obtain as rapid and complete a reduction as possible, of the metal oxides, in particular, chromium oxide from the melt, the process in a simple manner may be realized in that the CO partial pressure prevailing within the iron bath reactor is lowered at least temporarily by introducing nitrogen, argon and/or other inert gases through the submerged tuyeres and interrupting the supply of oxygen-containing gases onto the bath surface.

A particularly advantageous application of the process according to the invention resides in the treatment of oxidic slags occurring in large quantities, such as, e.g., slags derived from waste incineration plants, blast furnace slags and steel works slags, by mixing and liquefying two or three of the afore-mentioned slags. A product suitable for the production of cement may be produced relatively quickly as a function of the precise analyses of the same and optionally upon the addition of suitable fluxes. As a rule, those slags are charged into the iron bath reactor in the cold state. If, however, one or more of these slags are available in the liquid state, liquid charging is to be preferred with a view to enhancing the economy of the process. The process in a particularly advantageous manner may be carried out in that dusts and/or other ground residual substances are additionally blown into the iron melt below the bath surface partially or altogether. The dusts and/or residual substances may be derived, for instance, from waste incineration plants or metallurgical and thermal processes and may include dangerous wastes, dusts, sludges, shredder residues and contaminated chemical products. In a particularly advantageous manner, one or several residual substances are charged into the iron bath reactor above the iron bath surface in liquid and/or solid form. Alternatively, it may also be proceeded in that two or several residual substances are charged into the iron bath reactor premixed, in liquid form or as a solid substance.

The process according to the invention may be carried out in simple conventional converters, in particular, bottom-blowing converters, the technical adaptation for the purpose of process control optimization merely requiring little structural expenditure. Because of the particularly simple construction of such converters, the operating safety may be substantially increased, in particular. The arrangement according to the invention, for carrying out the process of the invention, comprising a bottom-blowing converter is characterized in that the converter is designed to be reduced in terms of cross sectional area or tapered in a region corresponding to the desired iron bath height and is equipped with at least one probe for detecting the formation of foam, for determining the concentration of carbon within the iron bath and/or the temperature of the slag and/or the gas space, whose signals are transmitted to a control circuit for carbon proportioning and/or iron bath tapping. In this manner, the desired iron bath height may be obtained at low iron bath quantities such that the introduction of the carbon required may be further reduced altogether.

BRIEF DESCRIPTION OF THE DRAWINGS

In the following, the invention will be explained in more detail with reference to the drawing and by way of exemplary embodiments. In the drawing.

DETAILED DESCRIPTION OF THE PREFERRED EMBODIMENTS OF THE INVENTION

Exemplary Embodiment 30 tons of molten pig iron and 20 tons of liquid slag mixed in a ladle at first were desiliconized, to which end lime was blown in. After this, coal was blown into the iron bath. The slag was charged in two equal portions, the second slag portion having been added after blowing in of 50% of the coal amount calculated for the total melt, and the residual amount of coal having been blown in. The chromium oxide content was reduced from originally 1200 ppm to 100 ppm within a period of time of less than 5 minutes, the carbon content of the iron bath amounting to a minimum of 2.65%. It was found in a number of tests that the decrease of the chromium oxide content in the slag to justifiable values could not be guaranteed with carbon contents of below 2% by weight.

Figure 1:
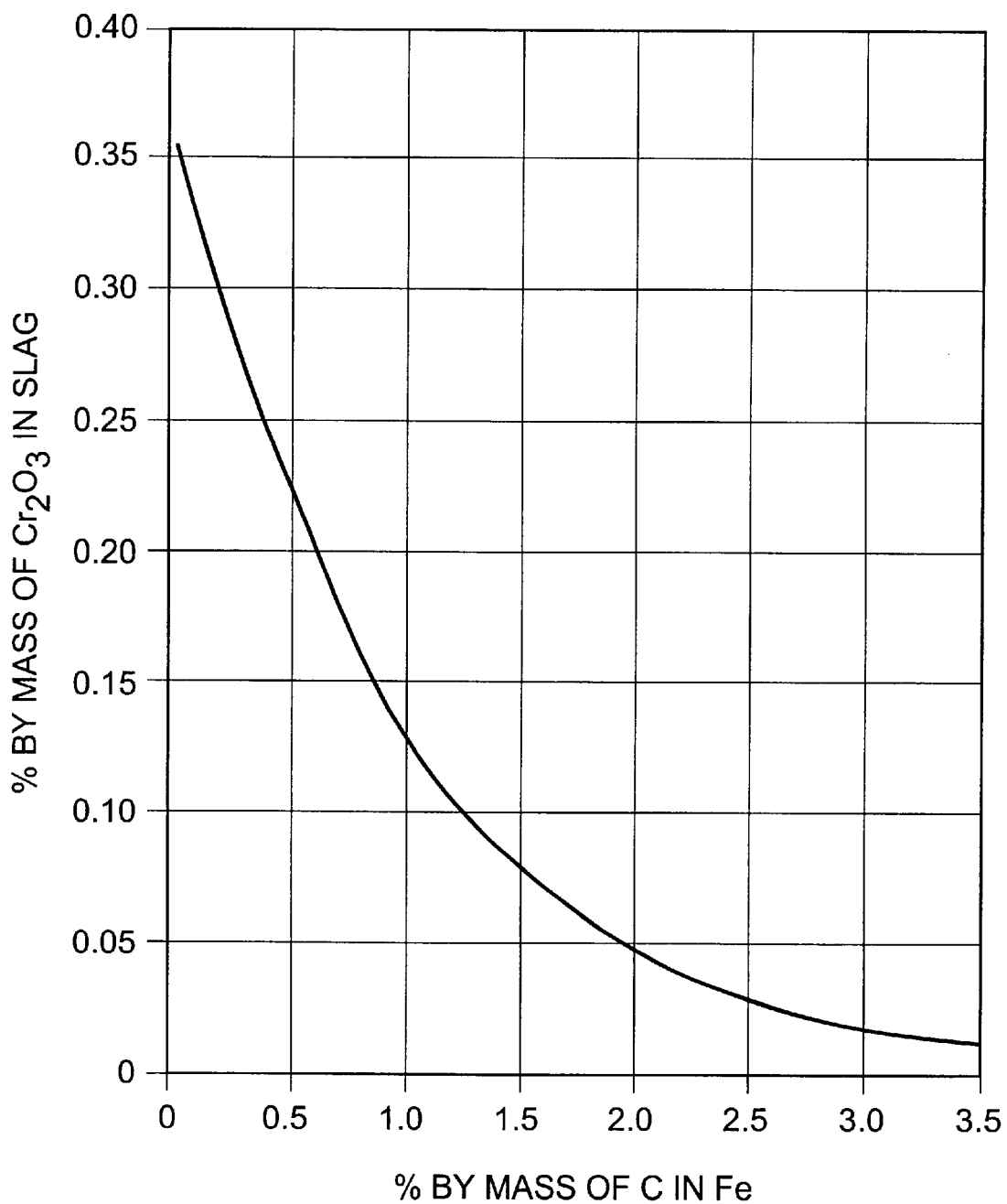
FIG. 1 illustrates the relationship between the carbon content of the bath and the $Cr_2O_3$ reduction of the slag.

As is apparent from FIG. 1, the chromium dioxide content in the slag with carbon contents of 2% by weight in the slag could be lowered to 500 ppm at the most, what does not appear acceptable for subsequent uses in the cement industry. Yet, at values of above 2.5% by weight of carbon in the iron bath, values of far below 500 ppm could already be ensured in a reproducible manner, those values continuously improving with the carbon content increasing to approximately 3.5%. Further decreases of the chromium oxide contents of the slag at carbon contents of 3.5 to 4.6% by weight remained substantially linear, wherein economic process control is no longer safeguarded upon exceeding of the upper limit of 4.6.% by weight due to the initially mentioned side effects.

Figure 2:
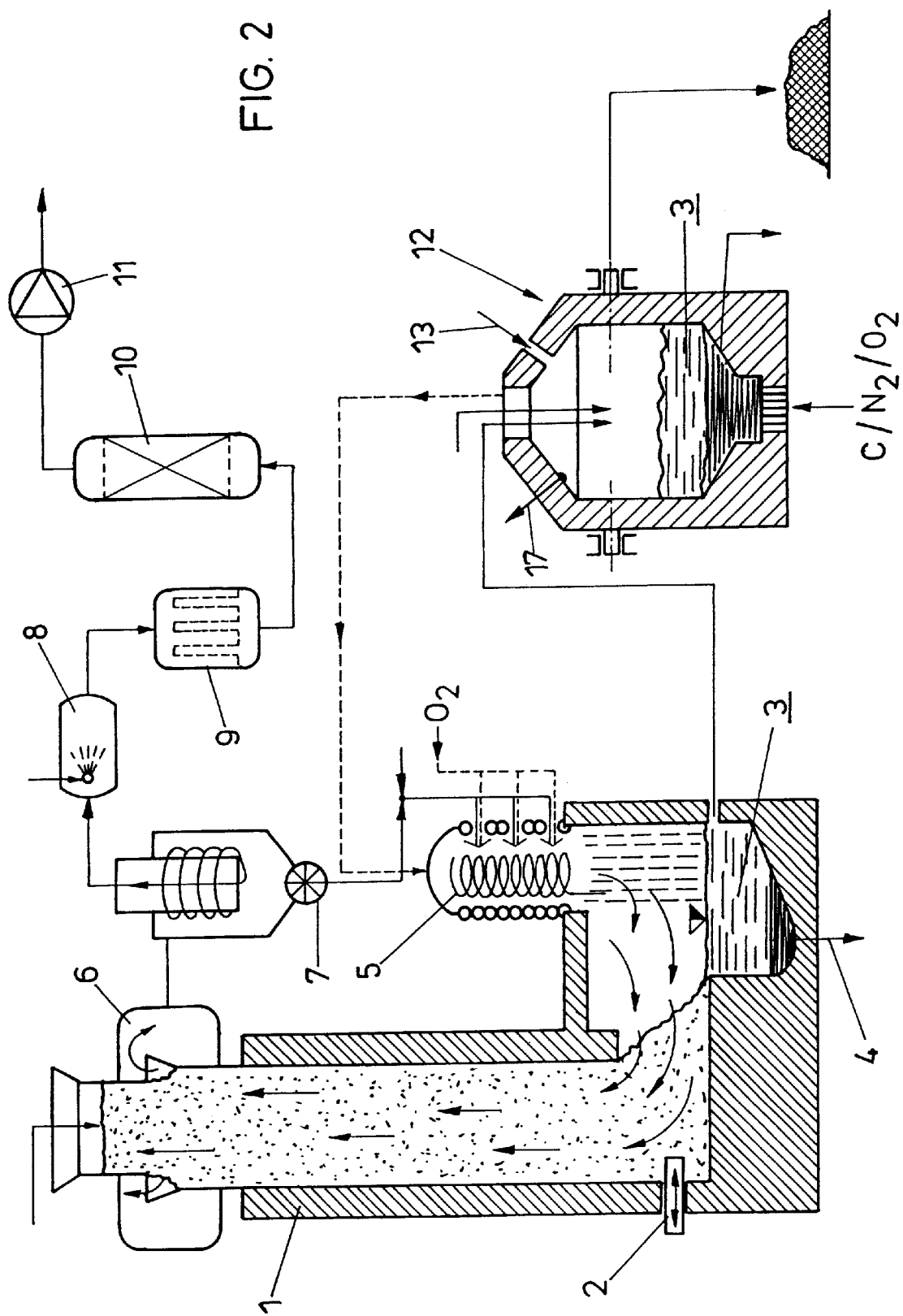
In FIGS. 2 and 3 arrangements for carrying out the process according to the invention are schematically represented.

In FIG. 2 a first arrangement for carrying out the process according to the invention is illustrated in more detail. A meltdown oxidizing reactor is denoted by 1, into which solid slags are introduced. The slags may be of various origin, waste incineration slags or metallurgical slags as well as mixtures of different slags being usable inter alia. The viscous slag, which has largely been liquefied, via a pusher 2 can be introduced into a first oxidation space, in which copper may be sedimented out of the liquid slag 3 by thermal dissociation and drawn off via a bottom outlet 4. In that partial region of the meltdown oxidizing reactor, in which a liquid slag is already present, also other products to be disposed of, such as, for instance, shredder light fraction as well as filter dusts from waste incineration or blast furnace dusts may be blown in and melted, for instance, by using a cyclone 5, wherein such dusts, for example, also may be drawn off the top region 6 of the meltdown oxidizing reactor and charged back to the cyclone for melting via a cellular wheel sluice 7. The dust-loaded gas amount drawn off the top 6 of the meltdown oxidizing reactor after purification in a hot gas cyclone may be further purified by cooling with quench water as indicated by 8, the residual heat being recoverable recuperatively, for instance, in a heat exchanger 9. After final purification in a counterflow activated coke filter 10, pure gas may be discharged via a blower 11.

The liquid slag 3 reaches a bottom-blowing converter 12, into which carbon, nitrogen and oxygen are charged through bottom tuyeres. The converter is designed so as to taper in its portion adjacent the tuyeres such that the liquid pig iron bath may reach the respectively desired bath level of between 300 and 1200 mm with a yet slight amount of pig iron. The liquid slag 3 is floating on the pig iron bath, wherein LD slag may also be supplied to the slag from the meltdown oxidizing reactor on that site. Melting, or maintaining the required slag temperature, with a view to obtaining a highly liquid slag can be ensured by top-blowing oxygen in the direction of arrow 13, wherein the bottom-blowing converter 12 in this case is designed as a tiltable converter thus being emptiable at regular intervals. Zinc and lead may be drawn off the gas space of the converter 12 in the gaseous phase along with $CO_2$ and/or CO, the gas mixture resulting after the condensation of zinc and lead being feedable to the hot cyclone 5.

The respective slag amount drawn off and freed from chromium to the major extent may be granulated and further used accordingly in the granulated form. The pig iron obtained may be further processed in the steel works at once.

Figure 3:
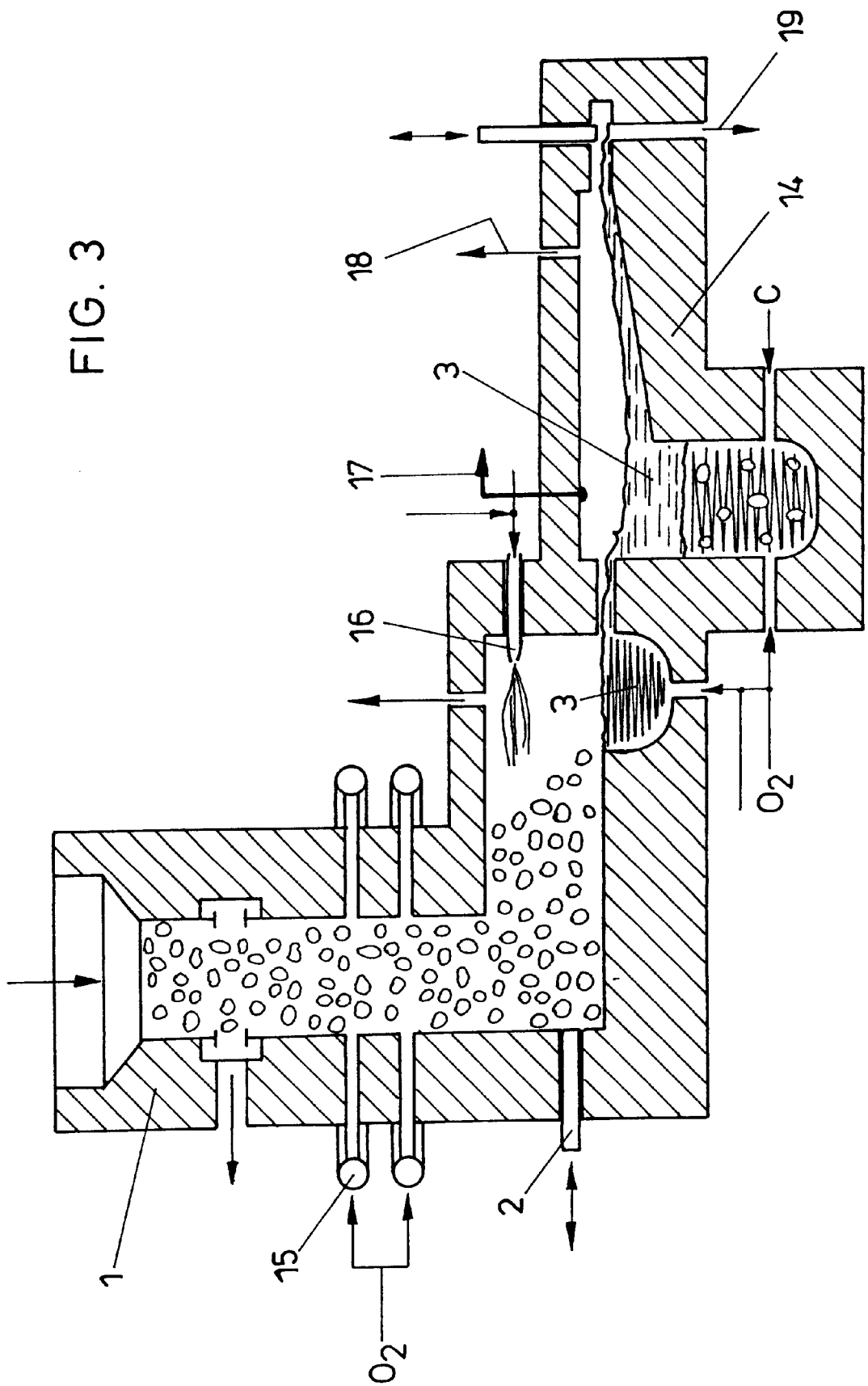

In the embodiment according to FIG. 3, the slag is continuously charged into the iron bath reactor 14. There is again provided a meltdown oxidizing reactor 1, in which slag preheating and/or iron combustion are effected. Oxygen is blown into the meltdown oxidizing reactor via concentric tuyeres 15 in order to attain the desired melting temperature. The material that has been incipiently melted to the major extent via the pusher 2 is transferred into the space in which liquid slag 3 collects. There, the necessary temperatures may be maintained by means of a burning lance 16 with the slag being continuously transferred into the consecutive iron bath reactor 14. Oxygen and carbon feeding in this embodiment takes place in the lower region of the iron bath, wherein the height of the iron bath above the oxygen and/or carbon blow-in tuyeres is controlled between 300 and 1200 mm as desired. As in the representation of FIG. 2, an echo-sounding device 17 is arranged within the iron bath reactor for monitoring foam formation in order to control the respective blow-in amount and pressure. The height of the pig iron bath may be detected by conventional methods and input into the desired control.

With the representation according to FIG. 3, zinc, lead and carbon monoxide may again be discharged from the iron bath reactor 14 via an exhaust means 18, the amount of slag treated during passage being supplied to a granulator for the production of pozzolanic granulates via a tap 19.

The arrangements schematically illustrated in FIGS. 2 and 3 are suitable for charging various combustion residues or slags, and also pyrolisates may immediately be charged in addition to waste incineration slags, thereby being able to save partially fossible energy for heating and melting the slag.

By effecting the proposed control via the height of the bath and/or the detection of inadmissible operating states, such as, for instance, excessive foaming, the mode of procedure may be optimized and automated to the major extent, wherein, in particular, also continuous operation enabling a particularly good economy may be ensured, as is apparent from the arrangement illustrated in FIG. 3.

What is claimed is:

1. A process for producing pig iron alloys and at least one member selected from the group consisting of pozzolanes, synthetic blast furnace slags, belite, and alite clinkers from oxidic liquid slag, said process comprising:

blowing at least one carbon carrier through submerged tuyeres of a reactor containing an iron bath and the oxidic liquid slag above the iron bath to reduce the oxidic slag, while controlling the amount of the carbon carrier blown through the submerged tuyeres with a measuring probe to maintain the iron bath at a carbon content of between 2.5 wt % and 4.6 wt %;

tapping pig iron from the reactor to maintain the iron bath at a height of between 300 mm and 1200 mm; and simultaneously with said blowing of the carbon carrier, feeding at least one member selected from the group consisting of oxygen and oxygen-containing gases into the iron bath in an effective amount to cause at least partial combustion of the carbon carrier, wherein the carbon carrier is selected from the group consisting of coal, coke, slack coal, brown coal coke, petroleum coke, graphite, and other carbon carriers.

2. A process according to claim 1, further comprising maintaining the carbon content of the iron bath between 2.5 wt % and 3.5 wt %.

3. A process according to claim 1, further comprising detecting formation of foam in the iron bath with an echo-sounding device or a sound level monitor, and flowing additional carbon and/or CaO through the submerged tuyeres in response to the formation of foam.

4. A process according to claim 1, controlling the pressure within blowing ducts leading to the submerged tuyeres as a function of the height of the iron bath so that the pressure is increased in response to increases in the height of the iron bath.

5. A process according to claim 1, further comprising blowing inert or oxidizing gases into the iron bath from below the iron bath at an overall blowing rate of from 2.5 $Nm^3$/min·ton of iron melt to 25 $Nm^3$/min·ton of iron melt, wherein the inert or oxidizing gases optionally are loaded with solids.

6. A process according to claim 2, further comprising blowing inert or oxidizing gases into the iron bath from below the iron bath at an overall blowing rate of from 2.5 $Nm^3$/min·ton of iron melt to 25 $Nm^3$/min·ton of iron melt, wherein the inert or oxidizing gases optionally are loaded with solids.

7. A process according to claim 1, further comprising blowing inert or oxidizing gases into the iron bath from below the iron bath at an overall blowing rate of from 5 $Nm^3$/min·ton of iron melt to 15 $Nm^3$/min·ton of iron melt, wherein the inert or oxidizing gases optionally are loaded with solids.

8. A process according to claim 2, further comprising blowing inert or oxidizing gases into the iron bath from below the iron bath at an overall blowing rate of from 5 $Nm^3$/min·ton of iron melt to 15 $Nm^3$/min·ton of iron melt, wherein the inert or oxidizing gases optionally are loaded with solids.

9. A process according to claim 1, further comprising continuously supplying the oxidic liquid slag above the iron bath and continuously drawing off portions of the liquid slag which has been reduced from above the iron bath.

10. A process according to claim 2, further comprising continuously supplying the oxidic liquid slag above the iron bath and continuously drawing off portions of the liquid slag which has been reduced from above the iron bath.

11. A process according to claim 1, further comprising either reducing the amount of the carbon carrier blown through the submerged tuyeres and into the iron bath or at least partially substituting CaO for the carbon carrier blown through the submerged tuyeres and into the iron bath in response to an upper temperature limit within the oxidic liquid slag or gas space within the reactor being exceeded.

12. A process according to claim 2, further comprising either reducing the amount of the carbon carrier blown through the submerged tuyeres and into the iron bath or at least partially substituting CaO for the carbon carrier blown through the submerged tuyeres and into the iron bath in response to an upper temperature limit within the oxidic liquid slag or gas space within the reactor being exceeded.

13. A process according to claim 1, further comprising discharging CO and $H_2$ gases from the iron bath and afterburning the CO and $H_2$ gases generated by said reducing within a gas space contained in the reactor by top-blowing oxygen or an oxygen containing gas optionally enriched with oxygen so that heat generated by said afterburning is transferred to the iron bath.

14. A process according to claim 2, further comprising discharging CO and $H_2$ gases from the iron bath and afterburning the CO and $H_2$ gases generated by said reducing within a gas space contained in the reactor by top-blowing oxygen or an oxygen containing gas optionally enriched with oxygen so that heat generated by said afterburning is transferred to the iron bath.

15. A process according to claim 13, further comprising lowering, at least on a temporary basis, partial pressure of the CO within the reactor by introducing nitrogen, argon and/or inert gases through the submerged tuyeres and interrupting said top-blowing of the oxygen or oxygen-containing gas.

16. A process according to claim 14, further comprising lowering, at least on a temporary basis, partial pressure of the CO within the reactor by introducing nitrogen, argon and/or inert gases through the submerged tuyeres and interrupting said top-blowing of the oxygen or oxygen-containing gas.

17. A process according to claim 1, further comprising blowing at least one member selected from the group consisting of lime, dolomite, bauxite, chamotte, fluor spar, calcium carbide, and other slag fluxes into the iron bath.

18. A process according to claim 2, further comprising blowing at least one member selected from the group consisting of lime, dolomite, bauxite, chamotte, fluor spar, calcium carbide, and other slag fluxes into the iron bath.

19. A process according to claim 17, further comprising blowing dusts and/or other ground residual substances into the iron bath below a surface of the iron bath.

20. A process according to claim 18, further comprising blowing dusts and/or other ground residual substances into the iron bath below a surface of the iron bath.

21. A process according to claim 1, further comprising charging at least one residual substance into the reactor above a surface of the iron bath, the residual substance being in a liquid and/or solid state.

22. A process according to claim 2, further comprising charging at least one residual substance into the reactor above a surface of the iron bath, the residual substance being in a liquid and/or solid state.

23. A process according to claim 1, further comprising charging at least two pre-mixed residual substances into the reactor above a surface of the iron bath, the premixed residual substances being in a liquid and/or solid state.

24. A process according to claim 2, further comprising charging at least two pre-mixed residual substances into the reactor above a surface of the iron bath, the premixed residual substances being in a liquid and/or solid state.

25. A process for producing pig iron alloys and at least one member selected from the group consisting of pozzolanes, synthetic blast furnace slags, belite, and alite clinkers from oxidic liquid slag, said process comprising:

blowing at least one carbon carrier through submerged tuyeres of a reactor containing an iron bath and the oxidic liquid slag above the iron bath to reduce the oxidic slag, while controlling the amount of the carbon blown carrier through the submerged tuyeres with a measuring probe to maintain the iron bath at a carbon content of between 2.5 wt % and 4.6 wt %;

tapping pig iron from the reactor to maintain the iron bath at a height of between 300 mm and 1200 mm; and simultaneously with said blowing of the carbon carrier, feeding air or oxygen into the iron bath in a first amount and blowing air or oxygen onto the oxidic liquid slag in a second amount to cause at least partial combustion of the carbon carrier, wherein a ratio of the first amount to the second amount is in a range of 1:2 to 1:3, and wherein the carbon carrier is selected from the group consisting of coal, coke, slack coal, brown coal coke, petroleum coke, graphite, and other carbon carriers.

26. A process according to claim 25, further comprising maintaining the carbon content of the iron bath between 2.5 wt % and 3.5 wt %.

27. A process according to claim 25, further comprising detecting formation of foam in the iron bath with an echo-sounding device or a sound level monitor, and flowing additional carbon and/or CaO through the submerged tuyeres in response to the formation of foam.

28. A process according to claim 25, controlling the pressure within blowing ducts leading to the submerged tuyeres as a function of the height of the iron bath so that the pressure is increased in response to increases in the height of the iron bath.

29. A process according to claim 25, wherein the air or oxygen is fed into the iron bath from below the iron bath at an overall blowing rate of from 2.5 $Nm^3$/min·ton of iron melt to 25 $Nm^3$/min·ton of iron melt, wherein the inert or oxidizing gases optionally are loaded with solids.

30. A process according to claim 25, wherein the air or oxygen is fed into the iron bath from below the iron bath at an overall blowing rate of from 5 $Nm^3$/min·ton of iron melt to 15 $Nm^3$/min·ton of iron melt, wherein the inert or oxidizing gases optionally are loaded with solids.

31. A process according to claim 25, further comprising continuously supplying the oxidic liquid slag above the iron bath and continuously drawing off portions of the liquid slag, which have been reduced, from above the iron bath.

32. A process according to claim 25, further comprising either reducing the amount of the carbon carrier blown through the submerged tuyeres and into the iron bath or at least partially substituting CaO for the carbon carrier blown through the submerged tuyeres and into the iron bath in response to an upper temperature limit within the oxidic liquid slag or gas space within the reactor being exceeded.

33. A process according to claim 25, further comprising discharging CO and $H_2$ gases from the iron bath and afterburning the CO and $H_2$ gases generated by said reducing within a gas space contained in the reactor by top-blowing oxygen or an oxygen containing gas optionally enriched with oxygen so that heat generated by said afterburning is transferred to the iron bath.

34. A process according to claim 33, further comprising lowering, at least on a temporary basis, partial pressure of the CO within the reactor by introducing nitrogen, argon and/or inert gases through the submerged tuyeres and interrupting said top-blowing of the oxygen or oxygen-containing gas.

35. A process according to claim 25, further comprising blowing at least one member selected from the group consisting of lime, dolomite, bauxite, chamotte, fluor spar, calcium carbide, and other slag fluxes into the iron bath.

36. A process according to claim 35, further comprising blowing dusts and/or other ground residual substances into the iron bath below a surface of the iron bath.

37. A process according to claim 25, further comprising charging at least one residual substance into the reactor above a surface of the iron bath, the residual substance being in a liquid and/or solid state.

38. A process according to claim 25, further comprising charging at least two pre-mixed residual substances into the reactor above a surface of the iron bath, the premixed residual substances being in a liquid and/or solid state.

* * * * *